Patented June 20, 1939

2,163,251

UNITED STATES PATENT OFFICE 2,163,251

AZO DYESTUFFS

Fritz Suckfüll, Leverkusen-Wiesdorf, Germany, assignor to General Aniline Works, Inc., New York, N. Y., a corporation of Delaware No Drawing. Application December 23, 1936, Serial No. 117,340. In Germany January 9, 1936

3 Claims. (Cl. 260—159)

The present invention relates to new polyazo dyestuffs, more particularly it relates to azo dyestuffs which may be represented by the following general formula:

$$A\!-\!N\!=\!N\!-\!B\!-\!N\!=\!N\!-\!C\!-\!N\!=\!N\!-\!D$$

In the said formula A means the radical of a diazotized amine or of a diazotized aminoazo compound, B means the radical of a diazotized amine coupled in para-position to the amino group, C means the radical of a diazotized aminoaroyl-amino-naphthol-mono- or disulfonic acid and D means the radical of an aminoarylpyrazolone.

My new dyestuffs are obtainable by coupling a diazo compound or a diazoazo compound with an amine capable of coupling in para-position to the amino group, further diazotizing, again coupling with an aminoaroyl-aminonaphthol-mono- or disulfonic acid, further diazotizing the polyazo dyestuff and finally coupling with an aminoaryl pyrazolone.

By this method new dyestuffs yielding in general brown shades further diazotizable in substance or on the fiber are obtained. The dyestuffs are also suited for after-treatment on the fiber with diazo compounds, as for example with diazotized para-nitraniline.

The dyeings can be discharged well in a neutral medium; when D of the above general formula stands for the radical of an aminoarylpyrazolone-3-carboxylic acid or a derivative thereof, dyestuffs are obtained which can be discharged well in a neutral and in an alkaline medium.

The invention is illustrated by the following examples; the parts being by weight.

Example 1

335 parts of hydrochloric acid (19° Bé.) are added to an aqueous solution of 223 parts of the sodium salt of meta-xylidine-ortho-sulfonic acid of the formula:

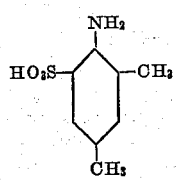

and the amine is diazotized at 15° C. by adding 69 parts of sodium nitrite. After diazotization is complete a solution of 140 parts of cresidine of the formula:

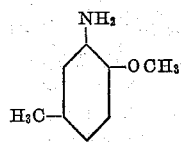

in 160 parts of hydrochloric acid (19° Bé.) and a small quantity of water are added and thereupon sodium acetate is added until the acid reaction to Congo red disappears. By heating to 40° C. coupling is finished, and the monoazo dyestuff is isolated from the solution acid to Congo red.

The dyestuff paste is dissolved in water with the addition of sodium carbonate solution until the solution is neutral to litmus. After addition of 75 parts of sodium nitrite, 700 parts of hydrochloric acid (19° Bé.) are poured in at 15° C. while stirring. When the diazotization is complete the diazo compound is isolated by squeezing and added to an aqueous solution of 360 parts of para-aminobenzoyl-2-amino-5-naphthol-7-sulfonic acid and 280 parts of sodium carbonate. The disazo dyestuff obtained is isolated, suspended in water and again diazotized at 18° C. after addition of 75 parts of sodium nitrite and 700 parts of hydrochloric acid (19° Bé.). After diazotization is complete a solution of 243 parts of 1-meta-aminophenyl-5-pyrazolone-3-carboxylic acid (sodium salt) and sodium acetate are added until the reaction is acid with acetic acid. After standing for several hours coupling is finished by addition of caustic soda lye until the reaction is alkaline. The dyestuff is squeezed off. It corresponds in its free state to the following formula:

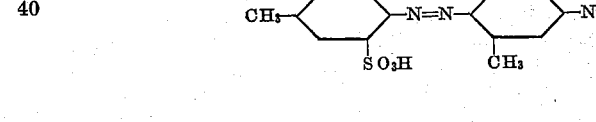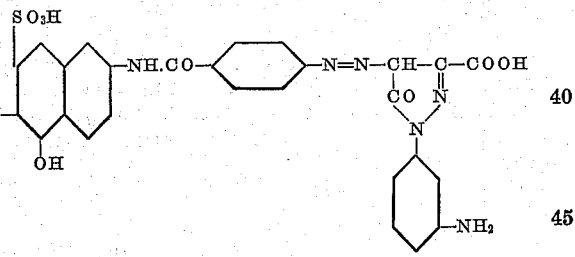

It dyes when diazotized and developed on the fiber with β-naphthol or meta-phenylene diamine brown shades. The dyeings are easily dischargeable in a neutral and also in an alkaline medium. When after-treated with diazotized para-nitraniline on the fiber, brown shades are likewise obtained.

On using as final coupling component 190 parts of para-aminophenyl-3-methyl-5-pyrazolone, a dyestuff is obtained which dyes cotton reddish brown after diazotizing on the fiber and developing with meta-phenylene diamine. This dyestuff is very easily dischargeable with a neutral discharge paste.

Example 2

By substituting 223 parts of a mixture of 1-naphthylamine-6- and 1-naphthylamine-7-sulfonic acid for the cresidine of Example 1, there are obtained when diazotized on cotton and coupled with meta-phenylene diamine brown shades, which can be discharged very well in a neutral and also in an alkaline medium.

The dyestuff corresponds in its free state to the following formula:

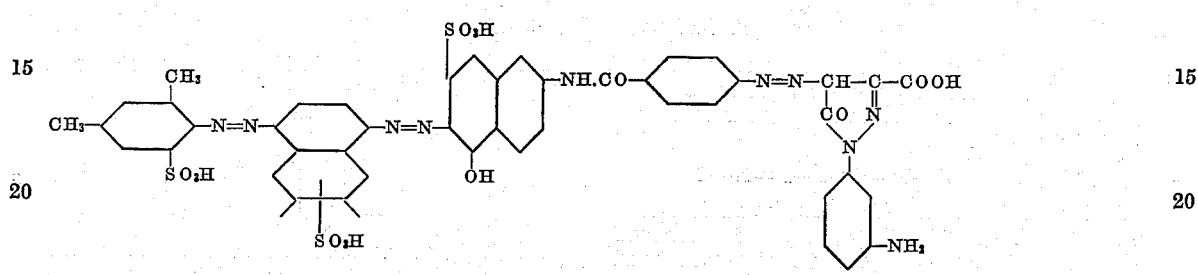

Example 3

By using instead of the para-aminobenzoyl-2-amino-5-naphthol-7-sulfonic acid of Example 1 an equivalent quantity of para-aminobenzoyl-2-amino-8-naphthol-6-sulfonic acid, there are likewise obtained after developing brown shades of very good dischargeability.

The dyestuff corresponds in its free state to the following formula:

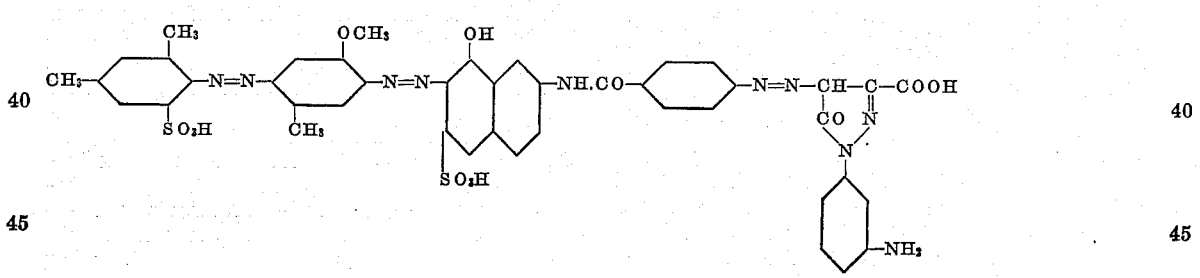

Example 4

By using instead of the para-aminobenzoyl-2-amino-5-naphthol-7-sulfonic acid of Example 1, an equivalent quantity of para-aminobenzoyl-1-amino-5-naphthol-7-sulfonic acid, brown dyestuffs of similar properties are likewise obtained.

The dyestuff corresponds in its free state to the following formula:

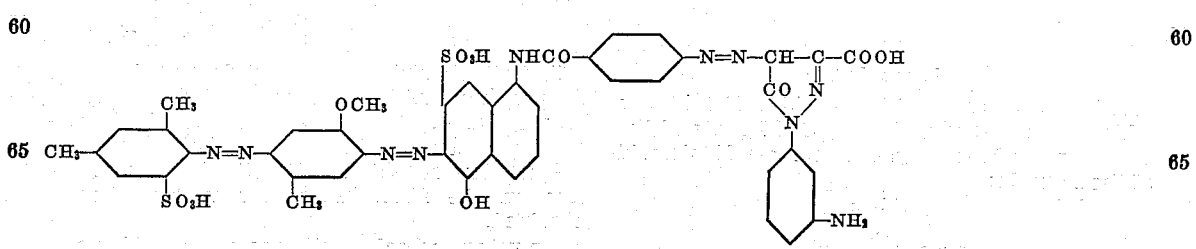

Example 5

303 parts of 2-naphthylamine-4.8-disulfonic acid are dissolved in water and 335 parts of hydrochloric acid (19° Bé.) and slowly at 10° C. 69 parts of sodium nitrite are added. To the diazo compound thus formed 110 parts of meta-toluidine dissolved in water and in 160 parts of hydrochloric acid (19° Bé.) are added. The coupling is completed by adding sodium acetate until the reaction is no longer acid to Congo red. The dyestuff is dissolved by the addition of aqueous caustic soda lye until reaction is neutral, 75 parts of sodium nitrite are added, and at 10° C. 700 parts of hydrochloric acid (19° Bé.) are poured in. The diazo compound is isolated after about 4 hours and added to an aqueous solution of 110 parts of ortho-toluidine and 160 parts of hydrochloric acid. Sodium acetate is added until the reaction is acid with acetic acid, whereby the coupling is completed. The aminodisazo dyestuff is isolated by squeezing from a solution acid to Congo red, dissolved with caustic soda lye and water until there is a neutral reaction, and by the addition of 75 parts of sodium nitrite and 700 parts of hydrochloric acid (19° Bé.) diazotized at 15–18° C. After standing for several hours the diazo compound is added to an aqueous solution of 360 parts of para-aminobenzoyl-2-amino-5-naphthol-7-sulfonic acid and 300 parts of sodium carbonate. The trisazo dyestuff is isolated, suspended in some water and again diazotized at 18° C. by adding 75 parts of sodium nitrite and 800 parts of hydrochloric acid (19° Bé.). Final coupling is effected with the sodium salt of 1-meta-aminophenyl-5-pyrazolone-3-carboxylic acid as described in Example 1. When dyed on cotton and developed after diazotization with meta-phenylene diamine there are obtained reddish brown shades of very good dischargeability both in a neutral and also in an alkaline medium.

The dyestuff corresponds in its free state to the following formula:

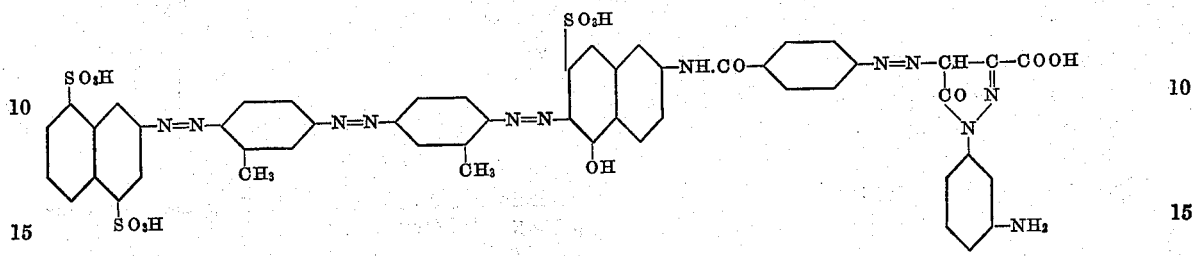

Example 6

By substituting 450 parts of para-aminobenzoyl-1-amino-8-naphthol-3.6-disulfonic acid for the para-aminobenzoyl-2-amino-5-naphthol-7-sulfonic acid of Example 5, there is obtained a dyestuff which yields when dyed on cotton, diazotized and developed with meta-phenylene diamine olive brown shades. The dyeings can be discharged to a pure white both in a neutral and also in an alkaline medium.

The dyestuff corresponds in its free state to the following formula:

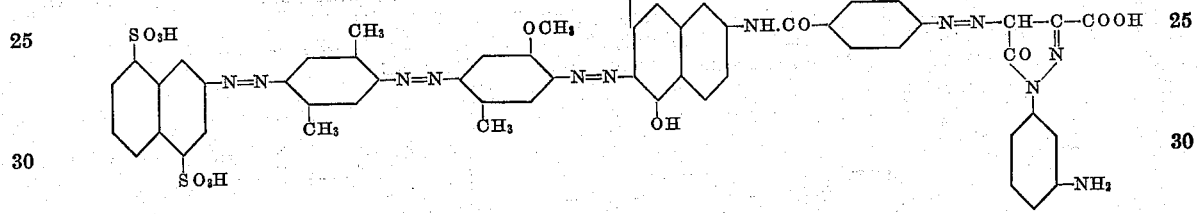

Example 7

303 parts of 2-naphthylamine-4.8-disulfonic acid are diazotized and coupled with 121 parts of para-xylidine, as described in Example 5, and after further diazotizing again coupled with 140 parts of cresidine, as indicated in Example 5. After again diazotizing, the product is coupled with 360 parts of para-amino-benzoyl-2-amino-5-naphthol-7-sulfonic acid and in an analogous manner to Example 1, finally diazotized and coupled with the sodium salt of 1-meta-aminophenyl-5-pyrazolone-3-carboxylic acid. After diazotizing and developing with meta-phenylene diamine there are obtained dark brown shades which can be discharged to a pure white both in a neutral and also in an alkaline medium.

The dyestuff corresponds in its free state to the following formula:

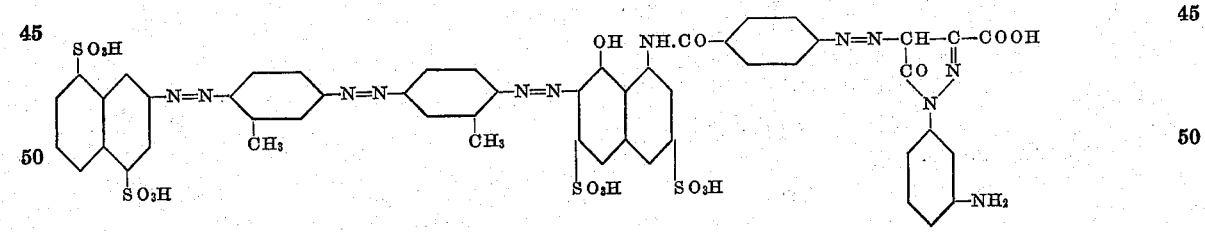

Example 8

223 parts of 2-naphthylamine-8-sulfonic acid are diazotized and coupled with 140 parts of cresidine, as indicated in Example 1. The aminoazo-dyestuff is further diazotized with 75 parts of sodium nitrite and 700 parts of hydrochloric acid (19° Bé.) and coupled with 360 parts of para-aminobenzoyl-2-amino-5-naphthol-7-sulfonic acid in a soda alkaline medium. The final coupling is performed with 1-meta-aminophenyl-pyrazolone-3-carboxylic acid, as indicated in Example 1.

After diazotizing and developing with meta-phenylene-diamine there are obtained on cotton brown dyeings which can be discharged both in a neutral and also in an alkaline medium.

The dyestuff corresponds in its free state to the following formula:

I claim:

1. Azo dyestuffs having in their free state the following general formula:

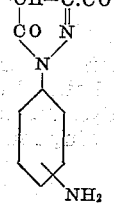

wherein A stands for a radical of the class consisting of benzene and naphthalene radicals, their homologues and alkoxy substituents which do not contain further diazotizable amino groups, B stands for a member selected from the group consisting of benzene and naphthalene radicals, their homologues and alkoxy substituents wherein the two azo groups are in para-position to each other, one of the radicals A and B containing at least one sulfonic acid radical, and C stands for a member selected from the group consisting of radicals of aroyl-amino-naphthol-mono- and di-sulfonic acids, the azo group attached to the pyrazolone nucleus being also attached to the aroyl radical of said sulfonic acid, yielding in general brown shades.

2. Azo dyestuffs having in their free state the following general formula:

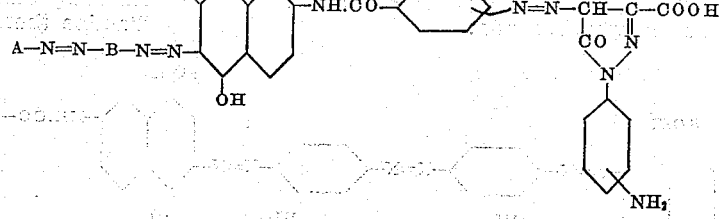

wherein A stands for a radical of the class consisting of benzene and naphthalene radicals, their homologues and alkoxy substituents which do not contain further diazotizable amino groups, B stands for a member selected from the group consisting of benzene and naphthalene radicals, their homologues and alkoxy substituents wherein the two azo groups are in para-position to each other, one of the radicals A and B containing at least one sulfonic acid radical, yielding in general brown shades.

3. The dyestuff having in the free state the following formula:

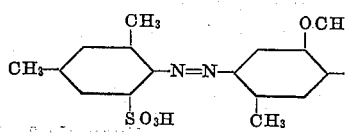
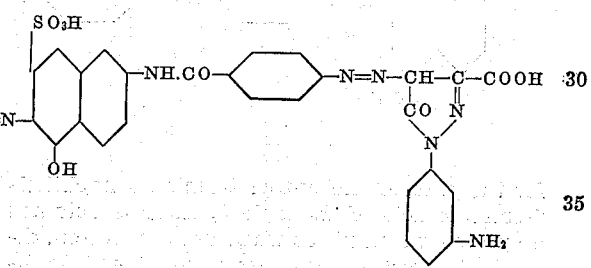

yielding brown shades and the dyeings being easily dischargeable in a neutral and also in an alkaline medium.

FRITZ SUCKFÜLL.